United States Patent Office 3,053,812
Patented Sept. 11, 1962

3,053,812
POLYMERIZABLE TRIAZINES AND
PRODUCTS THEREOF
Gaetano F. D'Alelio, South Bend, Ind., assignor, by direct and mesne assignments, to Dal Mon Research Co., Cleveland, Ohio, a corporation of Delaware
No Drawing. Filed Oct. 17, 1960, Ser. No. 62,894
20 Claims. (Cl. 260—78)

This invention relates to new monomers and to new polymeric materials derived therefrom and is particularly directed to the polymerization products obtained by polymerization products obtained by polymerizing a mass comprising a triazinyl compound, as defined hereinafter, in the presence or absence of other ethylenic compounds especially acrylonitrile. The invention also relates to compositions of these polymerization products adapted to the formation of shaped articles, in many cases to molecularly oriented shaped articles, particularly to fibers, threads, bristles, monofilaments, etc., hereinafter referred to as fibers, and other shaped articles such as films and the like, which articles show improved dyeing properties.

It has been known for some time that certain copolymers of acrylonitrile may be adapted to the preparation of shaped articles, such as films, fibers, foils, tubes, etc. Some of these copolymers have been regarded as capable of being cold-drawn to produce structures molecularly oriented along the fiber axis. Cold-drawing may be defined as the stretching of a polymeric material at a temperature below the melting point of the material to give a molecularly oriented structure.

The resistance of acrylonitrile polymers to dyes of all types has presented serious dyeing problems, especially in the development of synthetic fibers from these polymers. In fact, in order to dye polyacrylonitrile one commercial process resorts to the use of high pressures with water solutions or organic dispersions of dyes. It has been proposed that improvement in dye susceptibility can be obtained by the use of itaconic acid in small amounts as copolymerizing monomer in the preparation of acrylonitrile polymers. However, the polymer products obtained thereby have a tendency to crosslink upon standing at temperatures of at least about 70–80° C., or upon spinning from hot solutions. Such crosslinking causes spoliation of material by gelation during storage, embrittlement of fibers, fouling of spinning jets, and other production difficulties.

Recent attempts have been made to improve the dyeability of acrylonitrile polymers by using various polymerizable amine and amide compounds as copolymerizing monomers. However, it has been found that these comonomers cause undesirable salt formation and the products have a tendency to discolor upon exposure to light.

In accordance with the present invention, new triazinyl compounds, as defined hereinafter, have been found. It has been found further that these triazinyl compounds are polymerizable, either by themselves or in conjunction with other copolymerizable ethylenic compounds. Thus it has been found that these triazinyl compounds can be polymerized per se to form useful homopolymers. In addition it has been found that these triazinyl compounds can be polymerized with copolymerizable ethylenic compounds to form useful copolymers. Thus, in accordance with this invention, valuable polymerization products can be prepared by polymerizing a mass comprising one or more such triazinyl compounds, either in the presence or absence of other ethylenic copolymerizable compounds or their polymers. It has been found further that particularly valuable polymerization products having improved dyeing properties and improved resistance to salt formation and to discoloration in light are obtained by the polymerization of polymerizable masses comprising acrylonitrile and these triazinyl compounds, either in the presence or absence of other copolymerizable ethylenic compounds. It has been found further that valuable mixtures can be made comprising polymers of these triazinyl compounds and polymers of acrylonitrile. As used herein, the terms "polymers" and "polymerization products," unless specifically indicated otherwise, are intended to include copolymers and copolymerization products respectively.

The triazinyl compounds of this invention, hereinafter referred to as "triazine monomers," are represented by the following formula:

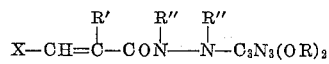

in which each R is respectively selected from the class consisting of hydrogen, and alkyl, aryl, aralkyl, alkaryl, and cycloaliphatic groups, and heterocyclic groups in the manner indicated below, all of which groups can have substituents of the class consisting of chloro, fluoro, alkoxy, aryloxy and acyloxy groups; R' is selected from the group consisting of hydrogen, chlorine, and the methyl group; R" is hydrogen or an alkyl, aryl, or cycloalkyl hydrocarbon radical, preferably hydrogen, and when one or the other or both R" groups represent hydrocarbon radicals each R advantageously has no more than six carbon atoms therein and is unsubstituted; $C_3N_3$ represents the trivalent symmetrical triazine radical; X is hydrogen, the cyano group, —COOR radical, a

radical, or a radical having the formula —COY wherein Y is a monovalent amide radical selected from the class consisting of —$NR_2$, piperidinyl, piperazinyl, and morpholino amide radicals.

The compounds of this invention are derivatives of acrylic, methacrylic, alpha-chloracrylic, beta-cyanoacrylic, beta-cyano-alpha-chloracrylic, beta-cyano-alphamethacrylic, maleic, fumaric, citraconic, mesaconic, chlormaleic, and chlorofumaric acids.

The alkoxy, aryloxy, and acyloxy groups for R are advantageously radicals of no more than about ten carbon atoms, such as methoxy, ethoxy, butoxy, pentoxy, octoxy, phenylmethoxy, phenylethoxy, acetoxy, propionoxy, butyroxy, valeroxy, capryloxy, benzoxy, phenylacetoxy, toluoxy, etc.

The radical R can be various groups of the type indicated above including methyl, ethyl, propyl, isopropyl, n-butyl, sec-butyl, amyl, hexyl, decyl, chloromethyl, chloroethyl, cyclohexyl, methyl-cyclopentyl, propyl-cyclopentyl, amyl-cyclopentyl, methyl-cyclopentyl, dimethyl-cyclohexyl, chloro-cyclohexyl, phenyl, chlorophenyl, fluorophenyl, xenyl, naphthyl, tolyl, chloro-tolyl, fluoro-tolyl, xylyl, ethyl-phenyl, propyl-phenyl, isopropyl-phenyl, benzyl, chloro-benzyl, phenethyl, phenyl-propyl, phenyl-butyl, acetoxy-ethyl, acetoxy-phenyl, acetoxy-benzyl, acetoxy-tolyl, acetoxy-cyclohexyl, chlorophenoxy-ethyl, acetoxy-propyl, acetoxy-isopropyl, methoxy-propyl, ethoxy-propyl, methoxy-phenyl, methoxy benzyl, methoxy-tolyl, methoxy-cyclohexyl, etc.

The preferred compounds of this invention are those in which R has less than twelve carbon atoms, has no ethylenic or acetylenic unsaturation therein, and no more than one of the substituent groups of the type defined, advantageously no substituent group;

Examples I–a through I-c illustrate methods of preparing various types of monomers of this invention. After each of these examples, a series of formulas are given of typical monomers. These monomers are identified by a series of Roman numerals and letters. The Roman numeral corresponds to a subsequent example illustrating the use of that particular monomer in the preparation of polymers. The capital letter in the polymer designation corresponds to the small letter in the designation of examples illustrating the method of producing that monomer. In the series of Roman numerals used to designate particular monomer formulas, I, II, and V are omitted since Examples I, II, and V are directed to procedures other than the preparation of polymers. After X, this listing has no particular significance since the examples illustrating polymerizations go no higher than X.

While other hydrocarbon and substituted hydrocarbon groups are also effective as R groups, the groups indicated above are preferred for reasons of availability and economy. Although many of the illustrations herein for OR groups show similar R groups, it is intended that mixed groups are also covered hereby, that is 2-methoxy-4-ethoxy derivatives, 2-ethoxy-4-phenoxy derivatives, etc.

It has been found that R groups of the size indicated above give the most effective results. While larger groups are also effective, triazine monomers containing such larger groups act more sluggishly and generally best results are obtained when the R groups each have less than twelve carbon atoms. Other groups can be substituted on R provided they are relatively inert during the preparation and use of the monomers.

Triazinyl compounds from which the triazinyl portion of the above formula can be derived are those symmetrical triazines (1,3,5-triazine) whose nucleus is

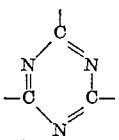

and to which an amide-forming hydrazine group is attached. Triazinyl compounds which can be used in preparing the compositions of this invention have the structure

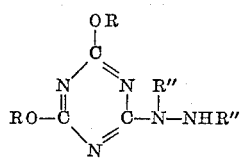

where R is as previously defined. Methods of preparing such intermediate compounds are known in the art.

This invention will be more fully described by the following examples. The invention is not to be regarded, however, as restricted in any way by these examples and they are to serve merely as illustrations. In these examples and throughout the specification, "parts" and "percentages" mean parts by weight and percentages by weight unless specifically provided otherwise.

EXAMPLES I–a

*Preparation of Triazine Monomer*

Acrylyl chloride (18.1 parts) in 150 parts of diethyl ether is added slowly and with stirring to a mixture of 32.4 parts of 2,4-dimethoxy-6-hydrazino-1,3,5-triazine and 150 parts of diethyl ether containing 37 parts of tributyl amine in a flask equipped with means for refluxing. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2-4-dimethoxy-6-(beta-acrylhydrazido)-1,3,5-triazine. Ultimate analyses for carbon, hydrogen, and nitrogen and molecular weight determination give values of 42.74%, 4.86%, 31.17%, and 226.2, respectively, all of which values are in close agreement with the theoretical values.

Substitution of an equivalent quantity of methacrylyl chloride for the acrylyl chloride in the foregoing procedure, yields the corresponding triazine monomer. Ultimate analyses and molecular weight determination gives 45.23% carbon, 5.45% hydrogen, 29.24% nitrogen, and molecular weight of 238.2, all of which values check closely with the theoretical values. The corresponding chloracrylic triazine monomer is prepared by the use of chloracrylyl chloride.

Various other triazine monomers of this invention can be prepared by the foregoing procedure using the appropriate acrylic and triazine intermediates. For example, the following monomers prepared accordingly are identified by the analyses and molecular weights indicated, all of which check closely with thhe theoretical values:

(*a*) 2,4 - diethoxy - 6 - (beta-acrylhydrazido) - 1,3,5-triazine, with carbon, hydrogen, nitrogen and molecular weight values of 47.53%, 5.90%, 27.76% and 254.1, respectively;

(*b*) 2,4 - diethoxy - 6 - (beta - chloracrylhydrazido)-1,3,5-triazine, with carbon, hydrogen, nitrogen, chlorine and molecular weight values of 41.81%, 4.85%, 24.38%, 12.43% and 276.7, respectively;

(*c*) 2,4 - diphenoxy - 6 - (beta - acrylhydrazido) - 1,3,5-triazine, with carbon, hydrogen, nitrogen and molecular weight values of 61.82%, 4.28%, 20.03% and 349.8, respectively;

(*d*) 2,4 - diphenoxy - 6 - (beta - chloracryl - hydrazido)-1,3,5-triazine, with carbon, hydrogen, nitrogen, chlorine and molecular weight values of 56.32%, 3.64%, 18.24%, 9.24% and 382.8, respectively.

Other methods of preparing the triazine monomers of this invention can also be used. For example, acrylic acid anhydride, as well as the corresponding alpha-methyl (methacrylic) and alpha-chloro (chloracrylic) derivatives can be used, according to well-known techniques for producing amides, with triazinyl hydrazines to give desired monomers of the formula defined above. In certain cases where a stable acryl hydrazide, such as

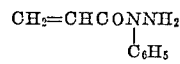

can be isolated, it can be reacted with a cyanuric chloride derivative

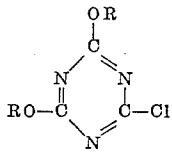

in the presence of an hydrohalide acceptor, such as sodium hydroxide, to produce triazine monomers by well-known procedures.

Typical symmetrical triazine hydrazines that can be used to give desired monomers of this invention include:

(1) $NH_2-NH-C_3N_3(OCH_3)_2$ (2) $NH_2-NH-C_3N_3(OC_2H_5)_2$ (3) $CH_3-NH-NH-C_3N_3(OC_4-H_9)_2$ (4) $NH_2-NH-C_3N_3(OC_6H_5)_2$ (5) $C_6H_5-NH-NH-C_3N_3(OCH_2CH_2OCH_2CH_3)_2$ (6) $NH_2-NH-C_3N_3(OCH_2C_6H_5)_2$ (7) $NH_2-NH-C_3N_3(OC_6H_{11})_2$ (8) $NH_2-NH-C_3N_3(OCH_2CH_2OOCCH_3)_2$ (9) $NH_2-NH-C_3N_3(OCH_2CH_2OC_6H_5)_2$

Various triazine monomers used hereinafter in the examples have the following structures:

Triazine monomer III-A

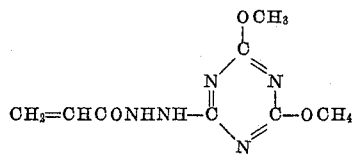

Triazine monomer IV-A

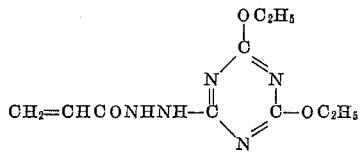

Triazine monomer VI-A

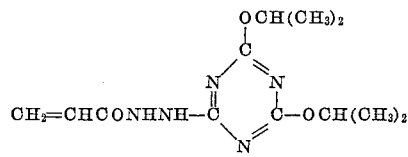

Triazine monomer VII-A

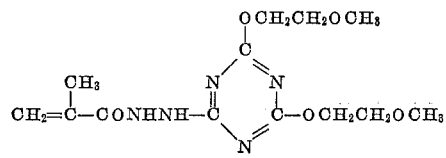

Triazine monomer VIII-A

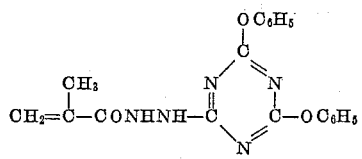

Triazine monomer IX-A

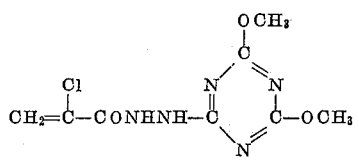

Triazine monomer X-A

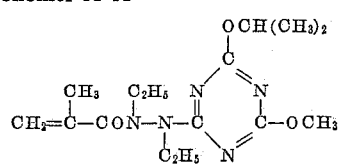

Triazine monomer XI-A

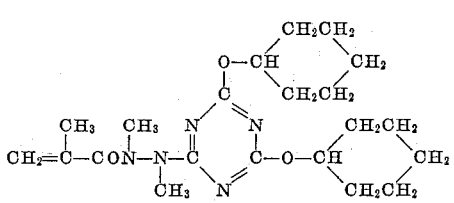

Triazine monomer XII-A

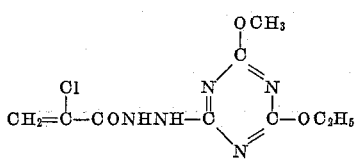

Triazine monomer XIII-A

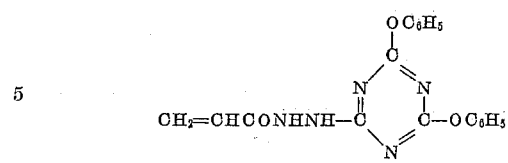

Triazine monomer XIV-A

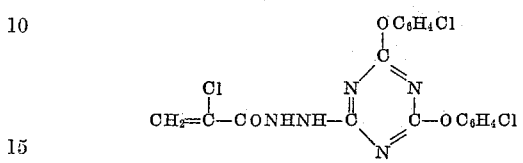

Triazine monomer XV-A

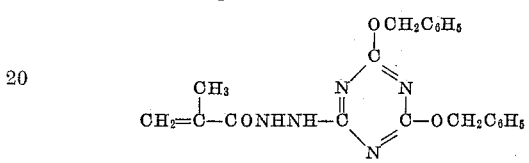

Triazine monomer XVI-A

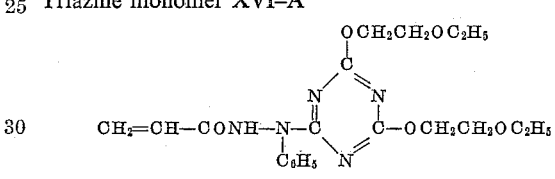

EXAMPLE I-b

*Preparation of Triazine Monomer*

Beta-cyanoacrylyl chloride (23.1 parts) in 50 parts of diethyl ether is added slowly and with stirring to a mixture of 32.4 parts of 2,4-dimethoxy-6-hydrazino-1,3,5-triazine and 150 parts of diethyl ether containing 37 parts of tributyl amine in a flask equipped for reflux. Upon completion of the addition of the acid chloride, the mixture is refluxed for approximately one-half hour and allowed to cool to room temperature, after which it is washed with water to remove the amine hydrochloride. The ether is then evaporated and the product again washed with water and recrystallized from acetone-water mixtures. There is obtained 2,4-dimethoxy-6-[beta-(beta-cyanoacryl)-hydrazido]-1,3,5-triazine. Ultimate analyses for carbon, hydrogen, and nitrogen, and molecular weight determination give values of 43.22%, 3.96%, 33.63%, and 249.3, respectively, all of which values are in close agreement with the theoretical values.

Substitution of an equivalent quantity of beta-cyanomethacrylyl chloride for its homolog in the foregoing procedure, yields the corresponding triazine monomer. Ultimate analyses and molecular weight determination give 45.51% carbon, 4.53% hydrogen, 31.84% nitrogen, and molecular weight of 265.1, all of which values agree closely with the theoretical values for 2,4-dimethoxy-6-[beta - (beta - cyanomethacryl)-hydrazido]-1,3,5-triazine. The corresponding chloracrylic derivative can be similarly prepared by use of beta-cyano-chloracrylyl chloride.

Various other triazine monomers of this invention can be prepared by the foregoing procedure using the appropriate beta-cyano-acrylic intermediates. For example, the following monomers prepared accordingly are identified by the analyses and molecular weights indicated, all of which check closely with the theoretical values:

(a) 2,4 - diethoxy - 6 - [beta - (beta - cyano - methacryl)-hydrazidol[-1,3,5-triazine, with carbon, hydrogen, nitrogen and molecular weight values of 49.32%, 5.47%, 28.76% and 293.2, respectively;

(b) 2,4 - diethoxy - 6 - [beta - methyl - beta - (beta-cyano-chloracryl)-hydrazido]-1,3,5-triazine, with carbon, hydrogen, nitrogen, chlorine and molecular weight values of 44.22%, 4.60%, 25.74%, 10.86% and 328.2%, respectively;

(c) 2,4 - diisopropoxy - 6 - [beta - (beta - cyanoacryl)-hydrazido]-1,3,5-triazine, with carbon, hydrogen, nitrogen and molecular weight values of 51.02%, 5.87%, 24.44% and 305.3, respectively;

(d) 2,4 - dicyclohexoxy - 6 - [beta - (beta - cyanoacryl)-hydrazido]-1,3,5-triazine, with carbon, hydrogen, nitrogen and molecular weight values of 59.12%, 6.72%, 21.81% and 387.3, respectively;

(e) 2,4 - diphenoxy - 6 - [alpha - methyl - beta - (beta-cyano-methacryl)-hydrazido]-1,3,5-triazine, with carbon, hydrogen, nitrogen and molecular weight values of 62.73%, 4.42%, 20.93% and 404.1, respectively.

Other methods of preparing the triazine monomers of this invention can be used. For example, the beta-cyanoacrylic acid anhydride, as well as the corresponding alpha-methyl (methacrylic) and alpha-chloro (chloracrylic) homologs can be used, according to well-known techniques for producing amides, with appropriate triazinyl amines to give desired triazine monomers. In certain cases, the triazinyl acrylic amide can also be prepared by reacting an acrylic amide, such as N,N-dimethyl-beta-cyano-acrylamide, with a triazinyl amine to give the corresponding triazine monomer by displacement of dimethyl amine. In other cases, where a stable hydrazide of beta-cyanoacrylic acid can be isolated, such as

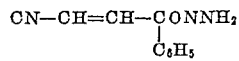

it can be reacted with a cyanuric chloride derivative,

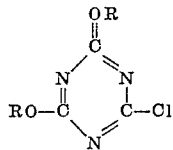

in the presence of an hydrohalide acceptor, such as NaOH, to produce triazine monomers by well-known procedures.

Typical triazinyl amines that can be used to give desired monomers of this invention include:

(1) $NH_2-NH-C_3N_3(OCH_3)_2$ (2) $NH_2-NH-C_3N_3(OC_2H_5)_2$ (3) $CH_3-NH-NH-C_3N_3(OC_4H_9)_2$ (4) $NH_2-NH-C_3N_3(OC_6H_5)_2$ (5) $C_6H_5-NH-NH-C_3N_3(OCH_2CH_2OCH_2CH_3)_2$ (6) $NH_2-N-C_3N_3(OCH_2CH_2OCOCH_3)_2$
         |
         $C_6H_5$ (7) $NH_2-N-C_3N_3(OCH_2CH_2OC_6H_5)$
         |
         $CH_3$ (8) $NH_2-NH-C_3N_3(OCH_2CH_2OCOC_6H_5)$ (9) $NH_2-NH-C_3N_3(OCH_2CH_2F)$

(10) 

(11) $NH_2-NH-C_3N_3(OC_6H_{11})_2$

Various triazine monomers used hereinafter in the examples have the following structures in which $C_3N_3$ represents the trivalent symmetrical triazine nucleus:

Triazine monomer III-B $CN-CH=CHCONHNH-C_3N_3(OCH_3)_2$

Triazine monomer IV-B $CN-CH=CHCONHNH-C_3N_3(OC_2H_5)_2$

Triazine monomer VI;B $CN-CH=CHCONHNH-C_3N_3[OCH(CH_3)_2]_2$

Triazine monomer VII-B

Triazine monomer VIII-B $CN-CH=CHCONHNH-C_3N_3(OC_6H_5)_2$

Triazine monomer IX-B

Triazine monomer X-B

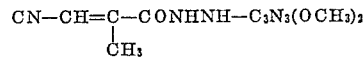

Triazine monomer XI-B

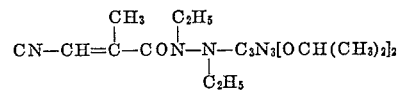

Triazine monomer XII-B

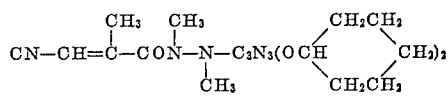

Triazine monomer XIII-B $CN-CH=CHCONHNH-C_3N_3(OC_6H_4OC_2H_5)_2$

Triazine monomer XIV-B

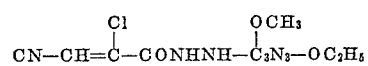

Triazine monomer XV-B

Triazine monomer XVI-B

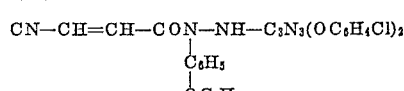

EXAMPLE I-c

*Preparation of Triazine Monomers*

(a) Maleic anhydride (9.8 parts) in 150 parts of benzene is added slowly and with stirring to a mixture of 17.1 parts of 2,4-dimethoxy-6-hydrazino-1,3,5-triazine and 150 parts of diethyl ether. Upon completion of the addition of the anhydride, the mixture is refluxed for approximately one hour, after which it is allowed to cool to room temperature and is washed with water. The ether and benzene are then evaporated and the ester is recrystallized from acetone-water mixtures. There is obtained the maleic acid mono-beta-hydrazide of the above triazine compound. Ultimate analyses and molecular weight determination show values which are in close agreement with the theoretical values.

Substitution of equivalent quantities of the various other triazinyl hydrazines described above for the one used in the foregoing procedure yields various mono-beta-hydrazides of maleic acid of this invention. Corresponding fumaric, mesaconic, citraconic, chloromaleic, and chlorofumaric derivatives are prepared by using the corresponding acid chloride according to the procedure (b) given below. These are identified by ultimate analyses and molecular weight determinations as above. These monoacid hydrazides can be used as such or can be converted to alkyl ester-hydrazides by reacting their sodium salts in the standard manner, with dialkyl sulfates, as for example with dimethyl or diethyl sulfate to produce the corresponding methyl, ethyl, or other alkyl esters. These ester-hydrazides can also be prepared as in the following procedure (b).

(b) The procedure of (a) is repeated using 14.85 parts of monomethyl fumaryl monochloride in 50 parts of diethyl ether instead of the maleic anhydride solution and also using 18.5 parts of tributyl amine in the solution of the triazine. After refluxing the reaction mixture is cooled and washed with water to remove the amine hydrochloride before solvent removal and recrystallization as in (a). The monomethyl ester of fumaric mono-beta-hydrazide of 2,4-dimethoxy-6-hydrazino-1,3,5-triazine is obtained which gives ultimate analyses and molecular weight values which check closely with the theoretical values. The fumaryl acid monochloride is similarly used to prepare the fumaric mono-acid triazine mono-beta-hydrazide. The corresponding monomethyl maleic chloride is similarly used to prepare the corresponding ester-hydrazide. Substitution of equivalent quantities of the various ethene-1,2-dioic monoester monochlorides and of various triazinyl hydrazines, as described above, for the monoester chloride and triazinyl hydrazine of the foregoing procedure, yields various corresponding ester-hydrazides of this invention. These are characterized by ultimate analyses and molecular weight determinations as above.

(c) The procedure of (b) is repeated using 7.65 parts of fumaryl dichloride instead of the 14.85 parts of monomethyl fumaryl chloride. The fumaryl di-beta-hydrazides of 2,4-dimethoxyl-6-hydrazino-1,3,5-triazine is obtained which gives ultimate analyses and molecular weight values which check closely with the theoretical values. Maleic dichloride and the dichlorides of the other ethene-1,2-dioic acids are used similarly to produce the corresponding triazine diester. When the various other triazinyl alcohols described above are substituted respectively in equivalent quantities in this foregoing procedure, the corresponding diesters are obtained.

(d) The procedure of (b) is repeated using 16.15 parts of mono(dimethylamido)-maleic chloride instead of the 14.85 parts of monomethyl fumaryl chloride. (This monoamide can be prepared by reacting, mole per mole, dimethylamine and maleic anhydride and subsequently converting the free acid group of the resulting mono-(dimethylamido) maleic monoacid to the acid chloride by the ordinary methods of converting acids to acyl chlorides, such as for example, by reacting with thionyl chloride.) There is obtained the mono-(dimethylamido) maleic ester of 2,4-dimethoxy-6-hydrazino-1,3,5-triazine which gives ultimate analyses and molecular weight values which check closely with the theoretical values. The corresponding fumaryl monoamide monochloride is used similarly to produce the corresponding amide-hydrazide. Substitution of various other ethene-1,2-dioic monoamides, and of various other triazinyl hydrazines, as described above, for the monoamide and triazinyl hydrazine of the foregoing procedure yields various amide-hydrazide triazine monomers of this invention.

Various other triazine monomers of this invention can be prepared by the foregoing procedure using the appropriate ethenedioic acid derivatives and triazine intermediates. For example, the following monomers prepared accordingly are identified by the analyses and molecular weight determinations, all of which check closely with the theoretical values: morpholino monoamide of maleic mono-beta-hydrazide of 2,6-diethoxy-6-hydrazino-1,3,5-triazine; piperidyl monoamide of fumaryl mono-beta-hydrazide of 2,4-dipropoxy-6-hydrazino - 1,3,5 - triazine; monobutyl ester of alpha-chlormaleic mono-beta-hydrazide of 2,4-dibutoxy-6-hydrazino-1,3,5-triazine; piperazinyl monoamide of alpha-methylmaleic mono-beta-hydrazide of 2,4-diethoxy-6-hydrazino-1,3,5-triazine.

Various other methods can also be used for the preparation of the monomers. For example, appropriate compounds of the formula

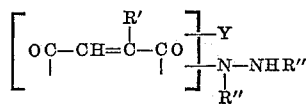

and

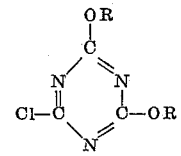

can be condensed in the presence of a hydrahalide acceptor such as sodium hydroxide under conditions known in the art for similar cyanuric chloride condensations, to produce desired triazine monomers.

Various triazine monomers used hereinafter in the examples have the following structures wherein $C_3N_3$ represents the trivalent triazine nucleus:

Triazine monomer III–C

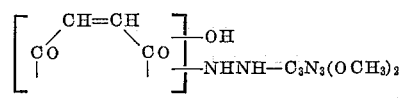

Triazine monomer IV–C

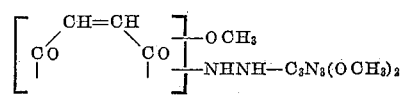

Triazine monomer VI–C

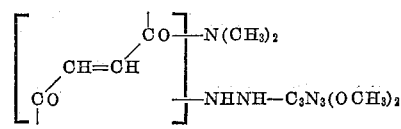

Triazine monomer VII–C

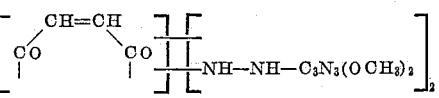

Triazine monomer VIII–C

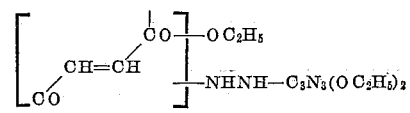

Triazine monomer IX–C

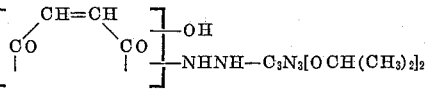

Triazine monomer X–C

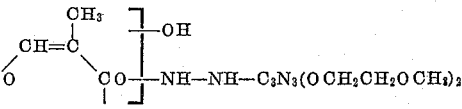

Triazine monomer XI–C

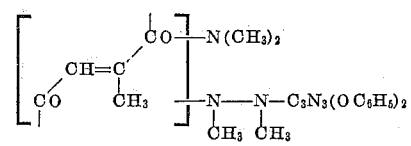

Triazine monomer XII–C

Triazine monomer XIII–C

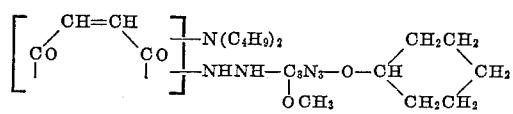

Triazine monomer XIV–C

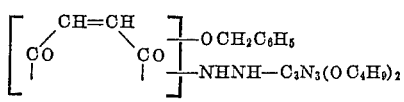

Triazine monomer XV–C

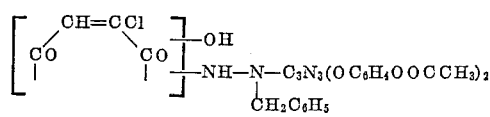

Triazine monomer XVI–C

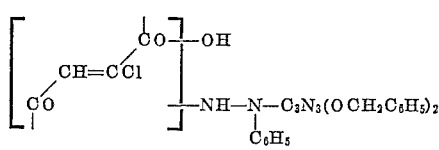

EXAMPLE II

*Homopolymerization of Triazine Monomer*

One hundred parts of the monomer prepared in Example I is slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for six hours, at which time a yield of about 90 percent solid polymer is precipitated. The resulting polymer has a molecular weight over 10,000. Some of the polymer is dissolved in N,N-dimethyl acetamide and a film cast from the resultant solution. When this film is dyed according to the technique described in Example III hereof, the film shows a dense and deep shade of blue.

Other monomers of this invention are similarly polymerized. The proportions of the triazine in the polymerization products of the invention may vary over a wide range, ranging from all or substantially all triazine down to very small amounts of triazine monomer such as may be employed in acrylonitrile polymers to impart dye susceptibility thereto. Although even smaller amounts are somewhat effective, the improvement in susceptibility of acrylonitrile copolymers to dyes becomes particularly noticeable when the triazine monomer content of the copolymer is about 0.1 percent and the susceptibility increases as the amount of triazine monomer is increased. Ordinarily sufficient improvement in dye susceptibility is obtained with amounts of the triazine monomer ranging up to about 10 or 15 percent but it may be advantageous for reasons such as in the preparation of ion-exchange polymers or as additives to improve dyeing properties to have a major proportion of triazine monomer in the acrylonitrile copolymer. In such cases, the concentration can range up to or approaching 100 percent. Within these proportions acrylonitrile copolymers of the invention show great affinity toward many dyes especially basic, acidic, vat and cellulose acetate dyes.

In addition to the improvements effected in the resulting copolymers, the use of the aforesaid triazinyl derivatives has certain other advantages over the use of the corresponding acids. For example, these triazinyl derivatives are more soluble in acrylonitrile than the acids. Thus it is generally easier to get complete copolymerization of the triazine monomer with acrylonitrile in solution, emulsion and suspension polymerizations.

The acrylonitrile copolymers discussed herein are soluble in N,N-dimethyl acetamide (DMA), N,N-dimethyl formamide (DMF), butyrolactone, ethylene carbonate and a number of similar solvents, used alone or in conjunction with N,N-dimethyl cyanamide, N,N-dimethyl cyanoacetamide, N,N-dimethyl methoxy-acetamide, methylene dinitrile, methylene di-thiocyanate, formyl caprolactam, formyl morpholine, tetra-methylene sulfone, etc. N,N-dimethyl methyl urethane of the formula $$(CH_3)_2NCOOCH_3$$

ethylene carbamate, N-methyl-2-pyrrolidone, etc. may also be used as solvents either by themselves or with the secondary solvents mentioned above. Nitroalkanes, such as nitro-methane, may be used as solvents for such copolymers having no more than about 85 percent acrylonitrile, providing the comonomers used in preparing such copolymers do not have substituent groups of equal or greater secondary bonding force than the cyano groups in acrylonitrile. Copolymers of the present invention which have high proportions of monomers of relatively low secondary-valance bonding strength such as vinyl chloride, may often be dissolved in acetone or mixtures of acetone or acetone with water and solvents of the above types.

EXAMPLE III

Five polymers of acrylonitrile are prepared in each case from the following monomer compositions containing individually as the triazine monomer those identified above as triazine monomer III–A, III–B, and III–C respectively.

| Polymer | Acrylonitrile, parts | Triazine monomer, parts |
| --- | --- | --- |
| A | 100 | 0.0 |
| B | 99.9 | 0.1 |
| C | 95 | 5.0 |
| D | 90 | 10.0 |
| E | 80 | 20.0 |

The 100 parts of monomer or monomer mixture is, in each case, slowly added over a period of less than an hour to 1000 parts of distilled water at 30–50° C. containing dissolved therein one part of ammonium persulfate, one part of sodium bisulfite and 0.5 part of sodium dodecylbenzene sulfonate. The reaction is continued for 6 hours, at which time a yield of about 90 percent solid polymer is precipitated. The resulting polymers have molecular weights over 10,000. Each polymer is dissolved in N,N-dimethyl acetamide and a film cast from each solution.

A water solution of methylene blue dye (a basic dye) is prepared by making a paste of the dye and then diluting to a 1 percent by weight dye solution. This type solution is kept boiling for one hour while the aforementioned films are immersed therein for one hour. The dyed films are then removed and separately subjected to washing with boiling water for one hour the boiling water being changed frequently to remove the desorbed dye. The unmodified polyacrylonitrile film shows only a light tint, whereas the copolymers are a dense and deep shade. Identical films, cold-drawn and heat-treated, show dyeing characteristics similar to the undrawn films.

Fibers are spun from the same N,N-dimethyl acetamide solutions either by dry spinning or by wet spinning, into glycerine baths. The fibers are substantially freed from solvent and dried. After cold-drawing the dried fibers 600–900 percent at 120–145° C. and subsequently heat-treating them at 150° C. for one hour, the fibers are given the same dyeing and washing treatment described above with the same results as for the films, a light tint being acquired by the unmodified polyacrylonitrile fibers and a deep and dense color being given to the copolymer fibers.

Instead of the specific triazine monomers used in this example, the various other related triazine monomers as disclosed above, can be used with similar results.

EXAMPLE IV

Five polymers of acrylonitrile are prepared in each case from the following monomer compositions containing individually as the triazine monomer those identified above as triazine monomers IV-A, IV-B, and IV-C.

| Polymer | Acrylonitrile, parts | Triazine monomer, parts |
|---|---|---|
| A | 100 | 0.0 |
| B | 99.9 | 0.1 |
| C | 95 | 5.0 |
| D | 90 | 10.0 |
| E | 80 | 20.0 |

To 900 parts of water, adjusted to a pH of about three in a suitable reactor, is added one part sodium dodecyl benzene sulfonate, 1.0 part of ammonium persulfate, 0.5 part of sodium bisulfite, and 100 parts of monomer or monomer mixture.

The reactor is then flushed with deoxygenated nitrogen and heated with agitation to 50° C. for 24 hours. Steam is introduced into the reactor to remove unpolymerized monomers from the mixture. A small amount of aluminum sulfate is added to the mixture and the polymer in each case is isolated by filtration.

The polymer is then washed with water and with methyl alcohol. A portion of the polymer is dissolved in ethylene carbonate and a film cast from the solution. The film is washed entirely free of solvent and stretched at a ratio of about 8:1 in a glycerine bath at 135–145° C. The film is then washed with water and dyed in a bath containing 0.05 part of 1,5-diamino-4,8-dihydroxyanthraquinone-3-sulfonic acid, 0.03 part sulfuric acid and 50 parts water (50:1 bath-film ratio) at boiling temperature for one hour. The film is then removed and washed with water and scoured for 15 minutes in a 0.4 percent soap solution at 85° C. Whereas the unmodified polyacrylonitrile has little or no color, all of the copolymers are dyed a deep blue shade.

Fibers are spun from the same solutions either by dry spinning, or by wet spinning. The fibers are substantially free from solvent and dried. After cold-drawing the dried fibers 600–900 percent at 120–145° C. for one hour, the fibers are given the same dyeing and washing treatment described above with the same results as for the films, a light tint being acquired by the unmodified polyacrylonitrile fibers and a deep and dense color being given to the copolymer fibers. The polymers of this example are also soluble in dimethyl formamide, dimethyl acetamide, dimethylsulfone, butyrolactone, formyl morpholine, etc.

Instead of the monomer of the preceding example, various other triazine monomers can be used as embraced by the formula given above, such as, for example, those identified above as triazine monomers X-A through XVI-C.

EXAMPLE V

Five parts of each of the copolymer fibers D of Example III are dyed to a green shade using the vat color dimethoxy-dibenzanthrone at 70° C. in a bath containing 0.5 part of dye, 0.25 part sodium hydroxide, 0.5 part sodium hydrosulfite and 100 parts of water (20:1 bath-fiber ratio). After the first 15 minutes of heating 0.25 part of Glauber's salt is added. The sample fibers are then oxidized in a 0.5 percent sodium dichromate-1.0 percent acetic acid aqueous solution at 70° C. for 30 minutes in a 20:1 bath-fiber ratio. The dyed fibers are scoured in a 0.5 percent boiling soap solution. A sample of yarn prepared from the unmodified polyacrylonitrile and dyed under the same conditions results in a light shade of color.

When 1,5-di-p-anisoylamino-4,8 - dihydroxy - anthraquinone is used as the vat dye, the fiber is dyed a strong violet color.

EXAMPLE VI

The procedure of Example III is repeated in each case for the polymerization of the following monomer compositions containing individually as the triazine monomer those identified above as triazine monomers VI-A, VI-B, and VI-C respectively.

| Polymer | Acrylonitrile, Parts | Vinyl Chloride, Parts | Triazine Monomer, Parts | Copolymer Soluble in— |
|---|---|---|---|---|
| A | 92 | 5 | 3 | DMF, DMA, etc. |
| B | 87 | 10 | 3 | DMF, DMA, etc. |
| C | 82 | 15 | 3 | DMF, DMA, etc. |
| D | 77 | 20 | 3 | NO$_2$Me. |
| E | 57 | 40 | 3 | NO$_2$Me. |
| F | 37 | 60 | 3 | Actetone. |

Sometimes copolymers D and E, when dissolved in nitromethane may have gelled, partially dissolved particles known as fisheyes. In such cases, the solubility may be improved by the addition of small amounts of materials which are good solvents for acrylonitrile polymers, such as butyrolactone, dimethyl formamide, dimethyl acetamide, dimethylsulfone, etc. In addition certain materials which are relatively poor solvents for polyacrylonitrile, such as diethyl formamide, diethyl acetamide, diethyl propionamide, etc., may be added to improve the solubility. Also, when acetone solutions of copolymer F contain gelled particles, clarification of the solution may be effected by the addition of nitromethane, diethyl formamide, diethyl acetamide, etc.

Dyeing tests of these copolymers show improvements in dyeing susceptibility similar to those of Example III.

Instead of this specific triazine monomer, other triazine monomers, such as identified above as triazine monomers X-A through XVI-C, can be used with similar results.

EXAMPLE VII

The procedure of Example III is repeated in each case for the polymerization of the following monomer compositions containing individually as the triazine monomer those identified above as triazine monomer VII-A, VII-B, and VII-C respectively:

| Polymer | Acrylonitrile, Parts | Styrene, Parts | Triazine Monomer, Parts |
|---|---|---|---|
| A | 88.0 | 7 | 5.0 |
| B | 78.0 | 17 | 5.0 |
| C | 68.0 | 27 | 5.0 |
| D | 58.0 | 37 | 5.0 |

Dyeing tests of these copolymers show improvements in dye susceptibility similar to Example III. In place of styrene, various styrene derivatives may be used, such as alpha-methyl-styrene; nuclear-substituted chloro-styrenes, i.e., ortho-, meta-, and para-chloro-styrenes; dichloro-styrenes, for example, the 2,3-, 2,4-, 2,5-, 2,6-, 3,4-, and 3,5-dichloro-styrenes, trichloro styrenes; cyano-styrenes, such as ortho-, meta-, and para-cyano-styrenes, dicyano-styrenes; nuclear-substituted alkyl-styrenes, such as mono- and di-methyl-styrenes, mono- and di-ethyl-styrenes, mono- and di-isopropyl-styrenes; aryl-substituted styrenes, i.e., para-phenyl styrenes, etc., cycloaliphatic substituted styrenes, such as para-cyclohexyl-styrene; fluoro-styrenes, such as ortho-, meta-, para-fluoro-styrene, di-fluoro-styrenes, etc.; trifluoromethyl-styrenes, such as ortho-, meta-, and para-trifluoro-methyl-styrenes, di-(trifluoromethyl)- styrenes, and various other styrenes or mixtures of any number of these with each other or with styrene.

Instead of this specific triazine monomer, various other triazine monomers, such as those identified above as triazine monomers X-A through XVI-C, can be used with similar results.

EXAMPLE VIII

The procedure of Example III is repeated in each case for the polymerization of the following monomer compositions containing individually as the triazine monomer those identified above as triazine monomer VIII-A—VII-C.

| Polymer | Acrylonitrile, Parts | Vinylidene Chloride, Parts | Triazine Monomer, Parts | Copolymer Soluble in— |
|---------|----------------------|----------------------------|-------------------------|------------------------|
| A | 85 | 5 | 10 | DMF, DMA, etc. |
| B | 65 | 25 | 10 | DMF, DMA, etc. |
| C | 45 | 45 | 10 | DMF, DMA, etc. |
| D | 25 | 65 | 10 | DMF, DMA, etc. |
| E | 5 | 85 | 10 | DMF, DMA, etc. |

With the above vinylidene chloride copolymers and similar copolymers having a total of acrylonitrile and vinylidene chloride of at least 85 percent in the polymer molecules, only the more active solvents, such as butyrolactone, N,N-dimethyl acetamide, N,N-dimethyl formamide, etc., can be used as solvents. The above copolymers dye more readily and thoroughly than similar copolymers containing no triazine monomer groups.

In addition to copolymerization such as described above, it is also advantageous to polymerize the triazine monomers in the presence of preformed polymers and copolymers, for example polymers and copolymers of acrylonitrile. It is particularly advantageous, and excellent results are obtained, when one or more triazine monomers is added to a polymerization system in which acrylonitrile, for example, has just been homo- or copolymerized and in which the catalyst has not yet been deactivated and the polymer not yet separated therefrom, and polymerization is continued so as to polymerize or copolymerize the triazine monomers with the still-active polymer of acrylonitrile, etc. Good results are also obtained even when the prepolymer has been separated from the polymerization system and is resuspended in a polymerization system in which the triazine monomer subsequently is polymerized in its presence. The proportions and other conditions in both cases are similar to those used in various examples shown herein. For example, excellent results are obtained when Examples III, IV, VI, VII and VIII are repeated except that the triazine monomer is withheld and is added one hour before the end of the polymerization period. Excellent dyeing results in each case when tested according to Example V.

EXAMPLE IX

The procedure of Example III is repeated in each case for the polymerization of the following monomer compositions containing individually as the triazine monomer those identified above as triazine monomers IX-A, IX-B, and IX-C respectively:

| Polymer | Acrylonitrile, Parts | Vinylidene Chloride, Parts | Vinyl Chloride, Parts | Triazine Monomer, Parts |
|---------|----------------------|----------------------------|------------------------|-------------------------|
| A | 80 | 10 | 8 | 2 |
| B | 70 | 20 | 8 | 2 |
| C | 70 | 15 | 13 | 2 |
| D | 50 | 20 | 28 | 2 |
| E | 20 | 18 | 60 | 2 |

The dyeing tests of the copolymer products show dye susceptibility similar to the copolymers of Example III.

Instead of this specific triazine monomer various other triazine monomers, such as those identified above as triazine monomers X-A through XVI-C, can be used with similar results.

Instead of copolymerizing the above esters with the acrylonitrile, the esters may be polymerized independently as shown in Example II to produce homopolymers and the prepared polymer used to modify polyacrylonitrile or other acrylonitrile copolymers. The acrylonitrile polymers may be blended with up to 10 percent or more of the modifying polymers without serious loss in the physical or chemical properties of the resulting dyed structures, or may be added to acrylonitrile monomer and the mixture polymerized. The following example is illustrative.

EXAMPLE X

A 10 percent solution in dimethyl formamide is prepared from the polymer made in Example II and is added to a dimethyl formamide solution of polyacrylonitrile, containing 20 percent polymer so that a composition consisting of 90 parts of polyacrylonitrile and 10 parts of the above polymer is obtained. The solution is heated to 130° C., after which the solution is filtered. Films and fibers prepared from this mixture are dyed in accordance with the process of Example III, and satisfactory dyed, shaped articles are obtained. The unmodified polyacrylonitrile without the addition of the homopolymer shows little or no dye retention.

Instead of using the homopolymer of this example, copolymers of the triazine monomers, including those with other monomers, such as polymers D and E of Example IV, may be used as modifiers for the homopolymers or copolymers of acrylonitrile. For example, polymer E of Example IV, which consists of 80 parts of acrylonitrile and 20 parts of a triazine monomer has excellent compatibility with polymers of acrylonitrile and has little or no detrimental effect on the physical properties of oriented fibers and films. In many cases, it is desirable to use as modifiers copolymers which have even a higher ratio of the triazine monomer, as for example, 50 to 70 parts of the triazine monomer copolymerized with acrylonitrile or methacrylonitrile. In other cases, the copolymers of the triazine monomer with other monomers are satisfactory such as, for example, copolymers of styrene, vinyl chloride, vinylidene chloride, alpha-methylstyrene, vinylidene cyanide, etc.

When it is desired to modify an acrylonitrile copolymer, such as the copolymer of acrylonitrile and styrene or the copolymers of acrylonitrile and other copolymerizable ethylenic compounds, it is usually desirable to use as modifiers copolymers containing the same structural units as are present in the acrylonitrile copolymer. Thus as there are present in the acrylonitrile copolymer, structural units derived from the acrylonitrile and styrene, it is desirable to have present in the modifying copolymer structural units derived from styrene in addition to those derived from acrylonitrile and the triazine monomer. By thus including in the modifying copolymers structural units of the same type as the structural units of the copolymer to be modified, greater compatibility between the acrylonitrile copolymer to be modified and the modifying copolymer is obtained and the two are more readily soluble in the mutual solvent and will more readily mix into homogeneous polymer mixtures.

The polymerization products of the triazine monomers of the present invention have in the polymer molecule a plurality of repeating units of the formula

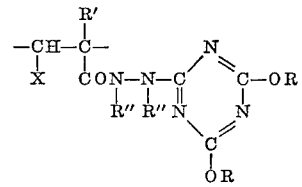

in which R, R'', and R' are as indicated above and will contain additional repeating units of the formula

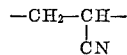

when the triazine monomer is copolymerized with acrylonitrile.

In addition, the copolymers may contain any number of repeating units of the type obtained by the copolymerization of the triazine monomer or a mixture of acrylonitrile and the triazine monomer with one or more copolymerizable ethylenic compounds, such as, for example, vinylidene chloride, vinyl chloride, styrene, alpha-methyl-styrene, methacrylonitrile, fumaronitrile, beta-cyanoacrylamide and methyl beta-cyano-acrylate, etc.

As previously indicated, the solvent resistance of such copolymers as contain one or more monomer units in addition to those formed by the acrylonitrile and the triazine monomer is affected by the type and proportion of copolymerizing monomer or monomers used to replace part of the acrylonitrile. For example, copolymers containing small amounts of the triazine monomer units may contain various proportions of such monomer units as obtained from vinylidene chloride, methacrylonitrile, fumaronitrile, and beta-cyano-acrylamide without considerable reduction in solvent resistance. Replacement of acrylonitrile units in the copolymers by vinyl chloride, styrene and alpha-methyl-styrene units result in copolymers of lowered solvent resistance, the amount of such lowering in resistance in each case depending on the amount substituted. In addition to the solvent resistance, certain other physical properties of the copolymers are affected by the presence of these additional units in the copolymers. The amount and character of the changes in physical properties of these copolymers depend again on the type and proportion of copolymerizing monomer or monomers used. For example the tensile strength of an acrylonitrile triazine monomer type copolymer will decrease much more when a monomer having relatively weak secondary bonding forces, such as styrene or ethylene is used to replace part of the acrylonitrile than when a monomer having relatively strong bonding forces, such as methacrylonitrile, fumaronitrile, beta-cyano-acrylamide, methyl beta-cyano-acrylate and vinylidene chloride, is used to replace part of the acrylonitrile. Moreover, the ability of these copolymers to form molecularly oriented shaped articles depends on the type and amount of the copolymerizing monomer or monomers used to replace acrylonitrile.

Other copolymerizable ethylenic compounds, which may also be present in the polymerizable masses for copolymerization with the esters used in the practice of this invention include one or more of the following: acrylates, e.g. methyl acrylate; methacrylates, e.g. methyl methacrylate; acrylamides; methacrylamides; vinyl esters, such as vinyl acetate; maleates, such as dimethyl and diethyl maleates; fumarates, such as dimethyl and diethyl fumarates; itaconic diesters, such as dimethyl and diethyl itaconates; itaconamide; vinyl halides, such as vinyl fluoride, vinylidene cyanide, vinylidene fluoride, tetrafluoroethylene, trifluorochloroethylene; vinyl aryls, such as vinyl naphthalenes and substituted styrenes as listed in Example VII, etc.

The polymerization products of this invention may be prepared by various polymerization systems, such as emulsion, suspension, mass and solution polymerizations. In addition to the monomers, the polymerizable mass may also contain other materials such as catalysts, e.g. peroxides, such as benzoyl peroxide, naphthyl peroxides, phthalyl peroxide, tertiary-butyl hydroperoxide, hydrogen peroxide, cyclohexyl hydroperoxide, tertiary-butyl perbenzoate, etc., azo-catalysts, persulfates, such as ammonium persulfate, etc., solvents, suspension or emulsion media, emulsifying agents, suspension agents, plasticizers, lubricants, etc.

For use in the preparation of shaped articles, the polymerization products of this invention have molecular weights preferably of at least about 10,000. However, polymerization products of molecular weights less than 10,000 may be used for other purposes, such as impregnants, solvent resistant coatings, etc. The molecular weight of the polymerization products is dependent on the concentrations of the monomers, the amount and type of catalyst, the temperature of reaction, etc.

As is quite generally known in the field of high polymers, molecular orientation is usually indicated and identified by birefringence of polarized light, as under Nicol prisms, by increased density as compared to the density of the same polymer unoriented, and by characteristic X-ray diffraction patterns. When a material is crystalline or oriented, its X-ray diagram shows bright areas or spots for points of crystallization and dark areas for the non-crystalline regions. The intensity or number of these bright spots increases with the degree of orientation or crystallization. Amorphous or non-crystalline materials give X-ray diagrams having very few high lights or bright spots whereas crystalline or oriented materials give definite X-ray diffraction patterns. In these patterns there are definite relationships of the bright spots with regard to position and spacing which are generally characteristic of the composition of the material being X-rayed. In fibers or films the orientation usually follows the direction of drawing or stretching so that the orientation is parallel to the fiber axis or a major surface.

Useful fibers can be made from the solutions of the copolymers of this invention by dry spinning, as in the preparation of cellulose acetate fibers, or by wet spinning, as in the preparation of viscose rayon. In wet spinning, the solution of copolymer can be spun into a substance which is non-solvent for the copolymer, but which is advantageously compatible with the solvent in which the copolymer is dissolved. For example, water, acetone, methyl alcohol, carbon disulfide, glycerine, chloroform, carbon tetrachloride, benzene, etc. can be used as a precipitating bath for N,N-dimethyl acetamide, dimethyl sulfone, butyrolactone and other solvent compositions of these copolymers. The extruded fibers, from which substantially all of the solvent has been removed in the spinning step, about 1–10 percent remaining in the shaped articles, can then be cold-drawn about 100–900 percent, preferably about 300–600 percent; and the drawn fiber heat-treated, usually at substantially constant length, at about 100–160° C. to effect further crystallization and the removal of the remaining solvent. The term "heat-treated," as used herein, refers to the application of heat to an object, usually at a controlled temperature and usually by means of the medium surrounding the object.

Many of the acrylonitrile copolymers of this invention can be molecularly oriented, especially if there is no more than 15 percent triazine monomer in the polymer molecule. This is true when the major portion of the copolymer is acrylonitrile, for example, 85 percent or more acrylonitrile, or when the other copolymerizing monomers used in making such copolymers have substituent groups having secondary-valence bonding forces equal to or greater than exhibited by the cyano group in acrylonitrile. For example, if such monomers as methacrylonitrile, fumaronitrile, vinylidene chloride, beta-cyano-acrylamide and methyl beta-cyano-acrylate are used with acrylonitrile and the triazine monomer, the proportion of acrylonitrile in the copolymers can be much less than 85 percent without destroying the capacity for molecular orientation. Molecularly oriented, cold-drawn, shaped articles of particular usefulness are prepared from copolymer compositions containing the polymer molecules 60–99.9 percent acrylonitrile, 0.1–15 percent, advantageously 0.1–5 percent, triazine monomer, with or without one or more monomers of the class consisting of vinylidene chloride, vinylidene cyanide, vinyl chloride, styrene, alpha-methyl-styrene, methacrylonitrile, fumaronitrile, beta-cyanoacrylamide and methyl beta-cyanoacrylate, the effects of the presence of the monomers of this class being noticeable when the monomer is present in the polymer molecule in amounts of 1 percent or more.

For example, cold-drawn fibers of excellent properties are prepared from copolymers containing about 60–98.9 percent acrylonitrile, about 0.1–5 percent triazine monomer and about 1–39.9 percent or one or more compounds selected from the class consisting of vinyl chloride, vinylidene chloride, styrene, alpha-methyl-styrene, methacrylonitrile, fumaronitrile, beta-cyano-acrylamide and methyl beta-cyano-acrylate.

The copolymerization products of this invention show great affinity for the acetate, basic, acidic, and vat dyes. The cellulose acetate dyes which are effective with these polymerization products are mainly amino-anthraquinone derivatives. The basic dyestuffs toward which these polymerization products show great affinity are preferably those which contain amide, alkyl-amido, or ammonium groups, such as —NH$_2$—N(CH$_3$)$_2$, —N(C$_2$H$_5$)$_2$, —NHC$_6$H$_5$, —N(CH$_3$)$_3$OH, etc. and which may also be used in the form of their salts, i.e., the hydrochlorides, sulfates or oxalates. Some of these basic dyes are Methylene Blue, Rhodamine B, Indamine Blue, Auramine, Meldola's Blue, Chrysoidine Y, Acridine Yellow, Magenta, Crystal Violet, Thioflavine T, Saffranine and Bismarck Brown. The cellulose acetate dyes which are effective with these polymerization products are mainly amino-anthraquinone derivatives, basic azo compounds and other basic substances, such as the Duranol, Dispersol, Sericol, etc. dyestuffs. A number of other acidic dyes that can be used are anthranilic acid→1-(4′ sulfophenyl), 3-methyl-5-pyrazolone, 1,5-diamino-4,8-dihydroxyanthraquinone-3-sulfonic acid; 1-aminonaphthalene-4-sulfonic acid→alphanaphthol-4-sulfonic acid; the sodium salt of sulfanilic acid→aniline→2-benzoyl - amino-5-naphthol-7-sulfonic acid;

1,5-diamino-4,8-dihydroxyanthraquinone-3-sulfonic acid; dye prepared by diazotizing 1-aminonaphthalene-4-sulfonic acid and coupled with alpha-naphthol-4-sulfonic acid; the sodium salt of (m-aminobenzoic acid→o-anisidine) phosgenated; the sodium salt of 2-naphhol-6,8-disulfonic acid←benzidine→phenol; ethylated dimethoxy-dibenzanthrone; and 1,5-di-p-anisoylamino-4,8-dihydroxyanthraquinone.

From the molecularly orientable copolymers of this invention fibers can be prepared having improved dyeing properties, low shrinkage in boiling water, sometimes as low as 3 to 5 percent or less of the cold-drawn or stretched article, good heat resistance, and tensile strength in order of 4 to 6 grams per denier. Moreover, these properties make the fibers desirable in the manufacture of hosiery and for such all-purpose fabrics as used for blouses, shirts, suits, etc.

The various starting materials or intermediates used in preparing the compounds of this invention are made by well known reactions to attach the desired substituent groups to the symmetrical triazine nucleus.

2,4-dimethoxy-6-chloro-1,3,5-triazine is prepared according to the method shown by Dudley et al. for the preparation of 2-chloro-4,6-dimethoxy-s-triazine (J. Amer. Chem. Soc. 73, 2989 (1951). The corresponding triazines having other alkoxy, aryloxy, and cycloalkyloxy groups in place of the methoxy groups are prepared by using other alcohols or aryl-hydroxy compounds in place of the methanol used by Dudley et al., for example, ethanol, propanol, butanol, cyclohexanol, phenol, naphthol, phenylethanol, etc.

*Preparation of Hydrazino Intermediates*

(a) Ten parts of 64 percent hydrazine in 160 parts of dioxane, together with 17 parts of sodium bicarbonate are placed in a reactor equipped with thermometer, stirrer and condenser. Thirty-five parts of 2,4-dimethoxy-6-chloro-1,3,5-triazine are added with stirring over a period of about 20 minutes during which the temperature rises to about 35° C. The reaction mixture is heated to 85–95° C. for about 4 hours. The resultant solution is cooled and evaporated at 40–50° C. under reduced pressure leaving a white residue which is extracted with 300 parts of dioxane and filtered. The filtrate is evaporated as before giving a yield of 21 parts of product which upon recrystallization from dioxane-water solution has a melting point of 146–148° C. The ultimate analyses check closely with the theoretical values for 2,4-dimethoxy-6-hydrazino-1,3,5-triazine.

(b) Triphenyl cyanurate (59 parts), prepared from cyanuric chloride and phenol according to the method shown by Schaefer et al., J. Amer. Chem. Soc. 73, 2990 (1951), and 10 parts of 64 percent hydrazine are added to 450 parts of dioxane and stirred for seven hours. The dioxane is then removed by evaporation under reduced pressure leaving a viscous oil. The oil is washed several times with 100 parts of hot water (75–85° C.) to remove phenol liberated by the reaction. The product is next recrystallized from alcohol-water solution. A yield of 39 parts of product is obtained having a melting point of 109–110° C. The ultimate analyses check closely with the theroretical values for 2,4-diphenoxy-6-hydrazino-1,3,5-triazine.

Other hydrazino-triazine compounds having other R groups suitable for use as intermediates for preparing the compounds of this invention are prepared by using other alcohols and phenols in place of both the methanol and phenol used in preparing the starting materials used in the above procedures (a) and (b). For example, ethanol, propanol, butanol, hexanol, phenol, toluol, benzyl alcohol, phenylethanol, cyclohexanol, methyl cyclohexanol, cyclopentanol, etc. can be substituted for the methanol in preparing the starting compound used in procedure (a). Likewise methanol, ethanol, propanol, hexanol, toluol, naphthol, benzyl alcohol, phenylethanol, cyclohexanol, etc. can be substituted for the phenol used in preparing the starting compound in procedure (b).

This application is a continuation-in-part of the co-pending applications Serial Numbers 732,157, 732,173, and 732,181, all filed on May 1, 1958.

While certain features of this invention have been described in detail with respect to various embodiments thereof, it will, of course, be apparent that other modifications may be made within the spirit and scope of this invention and it is not intended to limit the invention to the exact details shown above except insofar as they are defined in the following claims.

The invention claimed is:

1. As a new composition of matter, a compound having the formula

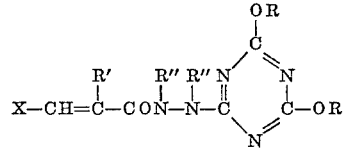

wherein R′ is selected from the class consisting of hydrogen, chlorine, and the methyl group; R″ is selected from the class consisting of hydrogen and alkyl, aryl, and cycloalkyl hydrocarbon groups having no more than six carbon atoms; X is a radical selected from the class consisting of hydrogen, the cyano radical, ester radicals having the formula —COOR, radicals having the formula

—CONR″NR″C$_3$N$_3$(OR)$_2$ and amide radicals having the formula —COY wherein Y represents a group selected from the class consisting of NR$_2$, piperidinyl, piperazinyl, and morpholino monovalent radicals; and each R is respectively selected from the class consisting of hydrogen, and alkyl, aryl, and cycloalkyl groups and monosubstituted derivatives of said alkyl, aryl, and cycloalkyl groups wherein the substituent is selected from the class consisting of chloro, fluoro, alkoxy, aryloxy, and acyloxy groups, said alkyl, aryl, and cycloalkyl groups each having less than 12 carbon atoms therein and said alkoxy, aryloxy, and acyloxy groups each have no more than 10 carbon atoms therein.

2. 2,4 - dimethoxy - 6 - (beta - acrylhydrazido) - 1,3,5-triazine.

3. 2,4 - diethoxy - 6 - (beta - acrylhydrazido) - 1,3,5-triazine.

4. 2,4 - dimethoxy - 6 - (beta - methacryl - hydrazido)-1,3,5-triazine.

5. 2,4-dimethoxy-6-(beta-chloracryl-hydrazido) - 1,3,5-triazine.

6. 2,4-dimethoxy-6-[beta-(betacyanoacryl)-hydrazido]-1,3,5-triazine.

7. The monomaleic beta-hydrazide of 2,4-dimethoxy-6-hydrazino-1,3,5-triazine.

8. The mono dimethylamide of the mono-maleic beta-hydrazide of 2,4-dimethoxy-6-hydrazino-1,3,5-triazine.

9. The mono methyl ester of the mono-maleic beta-hydrazide of 2,4-dimethoxy-6-hydrazino-1,3,5-triazine.

10. 2,4-dipropoxy - 6 - (beta-acrylhydrazido)-1,3,5-triazine.

11. 2,4 - diphenoxy - 6 - (beta-acrylhydrazido) - 1,3,5-triazine.

12. 2,4-dicyclohexyloxy - 6 - (beta-acrylhydrazido)-1,3,5-triazine.

13. 2,4 - dibenzyloxy - 6 - (beta-acrylhydrazido) - 1,3,5-triazine.

14. 2,4 - diphenethyloxy - 6 - (beta-acrylhydrazido)-1,3,5-triazine.

15. 2,4 - dipropoxy - 6 - (beta-methacrylhydrazido)-1,3,5-triazine.

16. 2,4 - diphenoxy - 6 - (beta-methacrylhydrazido)-1,3,5-triazine.

17. A shaped article comprising a copolymer of at least 60 percent by weight of acrylonitrile and a compound of claim 1, said copolymer having a molecular weight of at least 10,000.

18. A cold-drawn fiber having molecular orientation, said fiber comprising a copolymer of about 60–98.9 percent by weight acrylonitrile, about 0.1 to 5 percent by weight of a compound of claim 1, and about 1 to 39.9 percent by weight of a compound selected from the class consisting of vinyl chloride, vinylidene chloride, styrene, alpha-methyl-styrene, methacrylonitrile, fumaronitrile, beta-cyano-acrylamide, and methyl-beta-cyano-acrylate.

19. A polymerization product having in the polymer molecule a plurality of repeating units comprising at least 0.1 percent by weight of the units having the formula

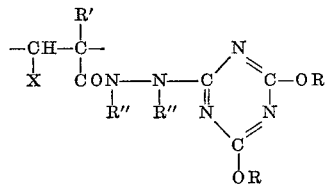

wherein R' is selected from the class consisting of hydrogen, chlorine, and the methyl group; R'' is selected from the class consisting of hydrogen and alkyl, aryl, and cycloalkyl hydrocarbon groups having no more than six carbon atoms; X is a radical selected from the class consisting of hydrogen, the cyano radical, ester radicals having the formula —COOR, radicals having the formula —CONR''NR''C$_3$N$_3$(OR)$_2$, and amide radicals having the formula —COY wherein Y represents a group selected from the class consisting of NR$_2$, piperidinyl, piperazinyl, and morpholino monovalent radicals; and each R is respectively selected from the class consisting of hydrogen, and alkyl, aryl, and cycloalkyl groups and derivatives of said alkyl, aryl, and cycloalkyl groups having one substituent group thereon selected from the class consisting of chloro, fluoro, alkoxy, aryloxy, and acyloxy groups, said alkyl, aryl, and cycloalkyl groups each having less than 12 carbon atoms therein and said alkoxy, aryloxy, and acyloxy groups each having no more than 10 carbon atoms therein.

20. A polymerization product of claim 19 having also in the polymer molecule a plurality of repeating units having the formula

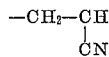

said repeating units representing at least 60 percent by weight of said polymer molecule.

References Cited in the file of this patent

UNITED STATES PATENTS 2,764,570     Kowalik et al. _____ Sept. 25, 1956